United States Patent Office
3,431,310
Patented Mar. 4, 1969

3,431,310
POLYALKYL CYCLOALKYL PHENOL POLYMERS
Bernard J. Davis and Larry B. Rosetti, Biloxi, Miss., assignors to Reichhold Chemicals, Inc., White Plains, N.Y.
No Drawing. Filed Sept. 28, 1967, Ser. No. 671,246
U.S. Cl. 260—619                8 Claims
Int. Cl. C07c 37/12; C08f 7/02

ABSTRACT OF THE DISCLOSURE

This disclosure describes a method of preparing a modified phenol polymer in two stages. The first stage consists in the formation of a Diels-Alder condensation product, which is subsequently polymerized into a polyalkyl cycloalkyl hydrocarbon, carrying cyclohexene groups. In the second stage this compound is reacted with a phenol, said phenol being attached to the olefinic group of the previously formed cyclohexene group.

---

Alkylated hydroxy aromatic compounds, known as alkyl phenols are well known to the art. These are generally prepared by reacting an alkyl chloride or an olefin with a phenol in the presence of a Friedel Crafts catalyst, aluminum chloride being typical. These are generally monophenolic mono or poly alkyls, for example octyl phenol or dioctyl phenol. In some cases, poly aryl hydrocarbons are prepared such as in the case of reacting chlorinated paraffin wax with phenol in the presence of aluminum chloride to produce poly aryl hydrocarbons as described in U.S. Patent 2,800,512. These are limited in over-all molecular weight by the hydrocarbon chain length of the chlorinated paraffin wax which serve as the phenolating substrate.

Phenolic resins as normally constituted are typified by the following general structures:

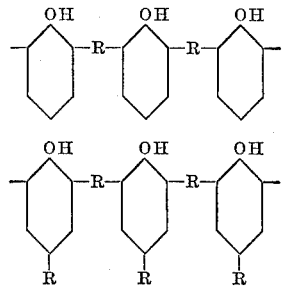

or

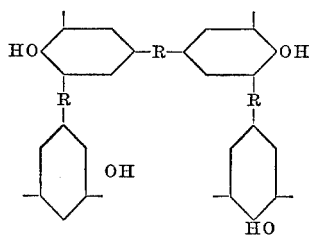

wherein R denotes an aliphatic or an aromatic group. In every case this alkyl group is intermittant to the phenolic group.

Unexpectedly, we now have found a method of preparing polyalkyl cycloalkyl phenol polymers that have high melting points, are resinous in nature rather than waxy or oily and have a molecular weight of approximately 2500. They are typified by the following structure:

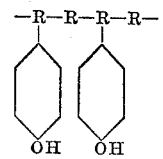

A cycloaliphatic polymer is the backbone in which R groups are not interrupted by phenolic bodies and this provides a polymer of different basic nature.

These resultant polyphenols can then be employed as made, in rubber as an extremely effective tackifier with antioxidative activity, or can be subsequently reacted with formaldehyde to form new types of high melting novolaks, heat reactive phenolics, two stage phenolics, modified molding compounds or as a modifier for standard phenolic resins of all types. These unique polyphenols can also be employed in the manufacture of new epoxy resins and blocked isocyanates.

Our unique products are produced in a two stage reaction. The first stage consists of first forming a Diels-Alder dimer of diolefins in a thermal reaction and continuing the application of heat and pressure to provide a hydrocarbon resin having a saturated backbone with appendant cyclohexene groups. The resultant polymer has a softening point of 150° C. and has a molecular weight of approximately 1300. This polyalkyl cycloalkyl hydrocarbon is then reacted in the second stage with a phenol in such a manner as to have the phenol attached through the olefinic group of the appendant cyclohexene. Any percentage or all of the cyclohexenes can thus be phenolated. This reaction is carried out by diluting the first stage resin in any suitable solvent. Any hydrocarbon solvent, aliphatic or aromatic, can be employed though we prefer xylol. The phenol is also admixed with a small percentage of xylol and the catalyst, boron trifluoride, is mixed with the phenolic solution. The temperature of the solution is maintained at 10–100° C.; we prefer 20–40° C. and the resin solution thereto added at such a rate that the reaction temperature does not exceed 35–40° C. When all of the hydrocarbon resin solution has been added, the reaction mixture is maintained at 40° C. for one hour. The catalyst is then quenched by washing or any suitable means and the final product obtained by first inert gas sparging off solvents and unreacted phenols, and finally steam sparging to a pot temperature of 260° C.

For the purposes of describing this invention the following typical reactions are portrayed:

STAGE I

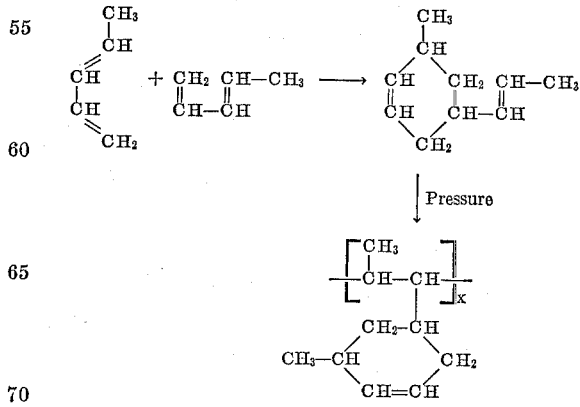

wherein X ranges from about 2 to about 10.

STAGE II

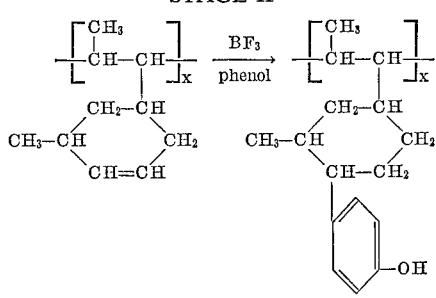

wherein X ranges from about 2 to about 10.

In the foregoing diagram of reaction where piperylene is shown as the diolefin, any other diolefins such as butadiene, isoprene, hexadiene 2-4, cyclopentadiene, alkyl cyclopentadiene or any conjugated poly olefin may be used alone or in admixture with any other conjugated polyolefin to form the reactive dimer or codimer.

In a typical reaction the olefins are charged to a pressure reactor and with all vents closed the temperature slowly brought to 140° C. At this point dimers form. The temperature is slowly brought to 250–300° C. with autogenic pressure of 100–300 pounds per square inch allowed to develop. The temperature is maintained at 265° C. for three hours. During this period, the pressure slowly reduces to 40–60 pounds per square inch. At the end of three hours the heat is cut off and the kettle allowed to cool to 160° C., at which point the pressure is zero. Twenty percent xylol is then added to the resin and the mixture cooled to 25° C.

In a second reactor, the phenol to be employed is dissolved in xylol so as to obtain an 80% solution of the phenol. This mixture is cooled to 20° C. and 2% boron trifluoride etherate is added to the cooled phenolic solution. For the purposes of this invention, phenol, bisphenol A, cresols, xylenols or any mono or poly hydroxy phenol, alkylated or nonalkylated, may be employed at a rate so as to react with any desired number of olefins in the stage I resin. The catalyst can be $BF_3$, or any of its complexes, $AlCl_3$, $AlBr_3$, $TiCl_4$, $SnCl_4$ or any Friedel-Crafts type catalyst.

The following examples will demonstrate in more detail the practice of this invention; but are to be considered as illustrative only, and not as limiting the invention to the exact details set forth therein.

Example I.—Preparation of stage I basic hydrocarbon polymer

To a 2 liter Parr laboratory pressure reactor was added 1,268 grams of an olefin concentrate consisting of 80% by weight piperylene and 20% monoolefins. The reactor was then closed and nitrogen purged through the system allowing the gas to escape through the vent valve for 15 minutes. The nitrogen was then cut off and the vent closed. Heat was applied bringing the reaction temperature to 140° C. in one hour. A pressure of 13 pounds per square inch developed. After 20 minutes, the temperature was increased over a period of one hour to 265° C. At this point the pressure was 185 pounds per square inch. The heat was cut off when the temperature reached 240° C. An exotherm carried the reaction to the desired 265° C. The reaction was then maintained at 265° C. for three hours. At the end of three hours, the pressure had dropped to 50 pounds per square inch. Heat was cut off and the reaction allowed to cool to 160° C. at which time the product was poured from the reactor. It consisted of a viscous amber colored liquid which on subsequent steam stripping demonstrated that it contained 80% by weight hydrocarbon resin with a ring and ball softening point of 140° C. In subsequent reactions, the stage I syrup was employed on the basis of containing 80% by weight solid resin.

An analysis of the solid resin steam sparged at 250° C. from the stage I syrup had the following properties:

| | |
|---|---|
| Yield, percent | [1] 80 |
| Softening point, ° C. | 140 |
| Iodine value | 140 |
| Bromine value | 24 |
| Hydroxyl value | 0 |
| Acid number | 0 |
| Color (Gardner) | 12 |
| Molecular weight | 1200 |

[1] Based on total olefin steam charged.

This corresponds to a structure as follows:

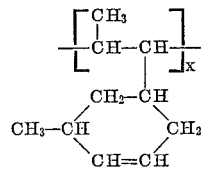

wherein X is approximately 10.

Example II.—Preparation of 50% phenolated polymer

To a reactor equipped with stirrer, thermometer, reflux condenser and inert gas sparge was charge 1,120 grams of stage I slurry, and 400 grams xylol. The mixture was cooled to 20° C. under nitrogen. To this was added a mixture of 263 grams phenol, 400 grams xylol and 14.4 grams boron trifluoride etherate, at a rate that did not allow the reaction temperature to exceed 28° C., using cooling. All of the phenol solution was added in one hour. The reaction was held at 28° C. for 1½ hours then at 100–110° C. for ½ hour. 41.5 grams lime and 23.5 grams Attapulgus Clay (manufactured by Minerals and Chemicals Philipp Corporation), were added and the mixture held ½ hour at 105° C. The product was then filtered and the filtrate inert gas sparged to 214° C. and steam stripped to 250° C. The steam stripping was continued until the ratio of water condensate by weight to oil was 9.5:0.5. The resultant resin was then poured and provided the following characteristics.

| | |
|---|---|
| Yield, percent | [2] 93 |
| Melting point (R&B), ° C. | 185 |
| Color (Gardner), 50% in toluol | 17½ |
| Hydroxyl value | 60 |
| Iodine number (Wijs) | 56 |
| Bromine number | 9.8 |
| Acid number | 0 |
| Specific gravity | 1.0681 |
| Molecular weight | 1800 |

[2] Based on 80% of Slurry I and all of the phenol.

Analysis showed carbon 85%, hydrogen 10.75%, oxygen 4.375%. This corresponds to the following structure:

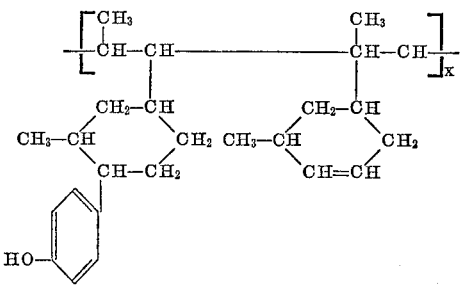

wherein X is approximately 5.

Example III.—Preparation of fully phenolated polymer

To a reactor as described in Example II was charged 1120 grams of stage I slurry and 400 grams xylol. The mixture was then cooled to 20° C. under nitrogen. To this was added a mixture of 536 grams phenol, 400 grams xylol and 29 grams boron trifluoride etherate, at a rate that did not allow the reaction temperature to exceed 28° C. using a cooling bath. All of the phenol solution was added in 1½ hours. The reaction mixture was held at 28° C. for 1½ hours then at 100–110° C. for ½ hour. 60 grams lime and 35 grams Attapulgus Clay were added and the mixture held ½ hour at 105° C. The product was then filtered and the filtrate inert gas sparged to 214° C. and steam sparged to 250° C. The steam stripping was continued until the ratio of water condensate to oil coming over was 9.5:0.5. The resultant resin was poured and provided the following characteristics.

| | |
|---|---|
| Yield, percent | [3] 95 |
| Melting point (R&B), ° C. | 190 |
| Color (Gardner), 50% in toluol | 17½ |
| Hydroxyl value | 120 |
| Iodine number | 5 |
| Bromine number | 1.4 |
| Acid number | 0 |
| Molecular weight | 2300 |
| Specific gravity | 1.0822 |

[3] Based on 80% of slurry I and all of the phenol.

Analysis showed C, 83.45%; H, 9.605%; O, 6.945%.

This closely approximate the following structure:

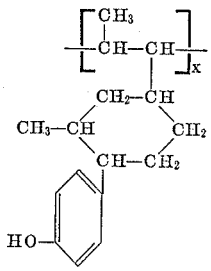

wherein X is approximately 10.

The invention has been described in detail for the purpose of illustration, but it will be obvious to those skilled in the art that numerous modifications may be resorted to without departing from the spirit of the invention as defined in the following claims.

We claim:

1. The method of preparing a polyalkyl cycloalkyl phenol polymer comprising (a) forming a hydrocarbon polymer carrying cyclohexene groups by heating under pressure conjugated diolefines to form a Diels-Alder condensation product and continuing to heat under pressure said Diels-Alder condensation product and (b) reacting said hydrocarbon polymer of step (a) with a phenol at a temperature not exceeding about 110° C., in the presence of a Friedel-Crafts type catalyst, in such a manner that said phenol is attached to said cyclohexene groups through their olefinic groups.

2. The method of preparing a polyalkyl cycloalkyl phenol polymer according to claim 1, where the amount of phenol ranges from about 1 to about 100% based upon the available amount of olefinic groups.

3. The method of preparing a polyalkyl cycloalkyl phenol polymer according to claim 1, where step (b) is performed in presence of a diluting solvent selected from at least one member of the group consisting of aromatic, aliphatic and chlorinated hydrocarbon.

4. The method of preparing a polyalkyl cycloalkyl phenol polymer according to claim 1, wherein the phenol is selected from at least one member of a group consisting of monomeric alkylated phenols, polymeric alkylated phenols, monomeric polyhydroxylated phenols and polymeric polyhydroxylated phenols.

5. The method of preparing a polyalkyl cycloalkyl phenol polymer according to claim 1, wherein the conjugated polyolefine is selected from at least one member of a group consisting of mononaphthenic hydrocarbons, polynaphthenic hydrocarbons, monoalkylenic hydrocarbons and polyalkylenic hydrocarbons.

6. A polyalkyl cycloalkyl phenol polymer, prepared according to method of claim 1.

7. The method of preparing a polyalkyl cycloalkyl phenol polymer comprising (a) forming a hydrocarbon polymer by heating under pressure a diolefine to form a Diels-Alder condensation product and continuing to heat under pressure said Diels-Alder condensation product to form said hydrocarbon polymer having the following configuration:

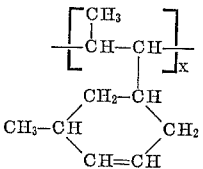

wherein X ranges from about 2 to about 10, (b) reacting said hydrocarbon polymer of step (a) with phenol at a temperature of below 110° C., in the presence of a Friedel-Crafts type catalyst, to form a polyalkyl cycloalkyl phenol polymer of the following configuration:

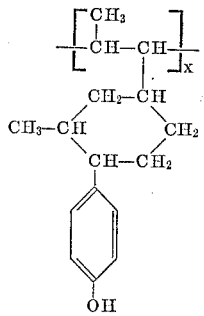

wherein X ranges from about 2 to about 10.

8. A polyalkyl cycloalkyl phenol polymer prepared according to method of claim 7.

References Cited

UNITED STATES PATENTS

| 3,110,699 | 11/1963 | Schmitz-Josten | 260—62 |
| 3,124,555 | 3/1964 | Bown et al. | 260—45.5 |

J. D. ANDERSON, *Primary Examiner.*

M. GOLDSTEIN, *Assistant Examiner.*

U.S. Cl. X.R.

260—62